United States Patent
Clark

(10) Patent No.: US 10,620,714 B2
(45) Date of Patent: Apr. 14, 2020

(54) CONFIGURATION BASED OPERATION MODE

(71) Applicant: HEWLETT-PACKARD DEVELOPMENT COMPANY, L.P., Houston, TX (US)

(72) Inventor: Alexander Wayne Clark, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/076,227

(22) PCT Filed: Apr. 7, 2017

(86) PCT No.: PCT/US2017/026569
§ 371 (c)(1),
(2) Date: Aug. 7, 2018

(87) PCT Pub. No.: WO2018/186883
PCT Pub. Date: Oct. 11, 2018

(65) Prior Publication Data
US 2019/0129511 A1    May 2, 2019

(51) Int. Cl.
*G06F 3/023* (2006.01)
*G06F 1/16* (2006.01)
(Continued)

(52) U.S. Cl.
CPC ............ *G06F 3/023* (2013.01); *G06F 1/1618* (2013.01); *G06F 1/1637* (2013.01);
(Continued)

(58) Field of Classification Search
CPC ...... G06F 3/023; G06F 3/0202; G06F 3/0231; G06F 1/1615; G06F 1/1618;
(Continued)

(56) References Cited

U.S. PATENT DOCUMENTS 9,329,713 B2   5/2016   Aurongzeb et al.
9,436,295 B2   9/2016   Kumar et al.
(Continued)

FOREIGN PATENT DOCUMENTS

CN   105045408 A  * 11/2015
CN   105045408 A    11/2015

OTHER PUBLICATIONS

Dell (Laptop Magazine: Dell Inspiron 15 7000 2-in-1 (Early 2016) Review, dated Feb. 21, 2016, retrieved from web on Sep. 12, 2019 from https://web.archive.org/web/20160701145622/https://www.laptopmag.com/reviews/laptops/dell-inspiron-15-7000-2-in-1-early-2016) (Year: 2016).*

(Continued)

*Primary Examiner* — Mark Edwards
(74) *Attorney, Agent, or Firm* — Brooks, Cameron & Huebsch PLLC

(57) ABSTRACT

Example implementations relate to configuration based operation modes. In some examples, a mobile computing device may include an integrated physical keyboard and an integrated display. The mobile computing device may include a memory resource comprising executable instructions to determine a configuration of the mobile computing device. The mobile computing device may include a memory resource comprising executable instructions to disable the integrated display and enable an operation mode permitting utilization of the physical keyboard with a non-integrated display based on the configuration.

14 Claims, 3 Drawing Sheets

(51) Int. Cl.
*G06F 3/02* (2006.01)
*G06F 21/44* (2013.01)

(52) U.S. Cl.
CPC .......... *G06F 1/1643* (2013.01); *G06F 1/1662* (2013.01); *G06F 3/0202* (2013.01); *G06F 3/0231* (2013.01); *G06F 21/44* (2013.01)

(58) Field of Classification Search
CPC .... G06F 1/1637; G06F 1/1643; G06F 1/1662; G06F 1/1675; G06F 1/1677; G06F 21/44
USPC ........................................................ 345/169
See application file for complete search history.

(56) References Cited

U.S. PATENT DOCUMENTS

| | | | |
|---|---|---|---|
| 2005/0235159 A1* | 10/2005 | Anandakumar | G06F 1/3203 713/185 |
| 2009/0201254 A1 | 8/2009 | Rais | |
| 2013/0181909 A1* | 7/2013 | Voronel | G06F 1/1618 345/173 |
| 2015/0146356 A1 | 5/2015 | Sharma et al. | |
| 2015/0153786 A1 | 6/2015 | Oakley | |
| 2016/0147266 A1* | 5/2016 | Chng | G06F 1/1616 713/100 |
| 2018/0165429 A1* | 6/2018 | Leong | G06F 21/31 |

OTHER PUBLICATIONS

7000UG (Dell Inspiron 7000 User's Guide, dated Aug. 17, 1999, retrieved from web on Sep. 12, 2019 from https://downloads.dell.com/Manuals/all-products/esuprt_laptop/esuprt_inspiron_laptop/inspiron-7000_Reference%20Guide3_en-us.pdf) (Year: 1999).*

Zakarh, "Unable to Use Laptop Keyboard in Tablet Mode With Monitor?", Article-Laptop Tech Support, 2015, 2 Pages.

* cited by examiner

CONFIGURATION BASED OPERATION MODE

BACKGROUND

Computing devices are prevalent in the human environment. Computing devices are relied on for work, entertainment, communication, and many other purposes. Transitioning between computing devices and sharing functions among computing devices in the environment may increase the utility of the computing devices and provide convenience to a user.

DETAILED DESCRIPTION

Figure 1:
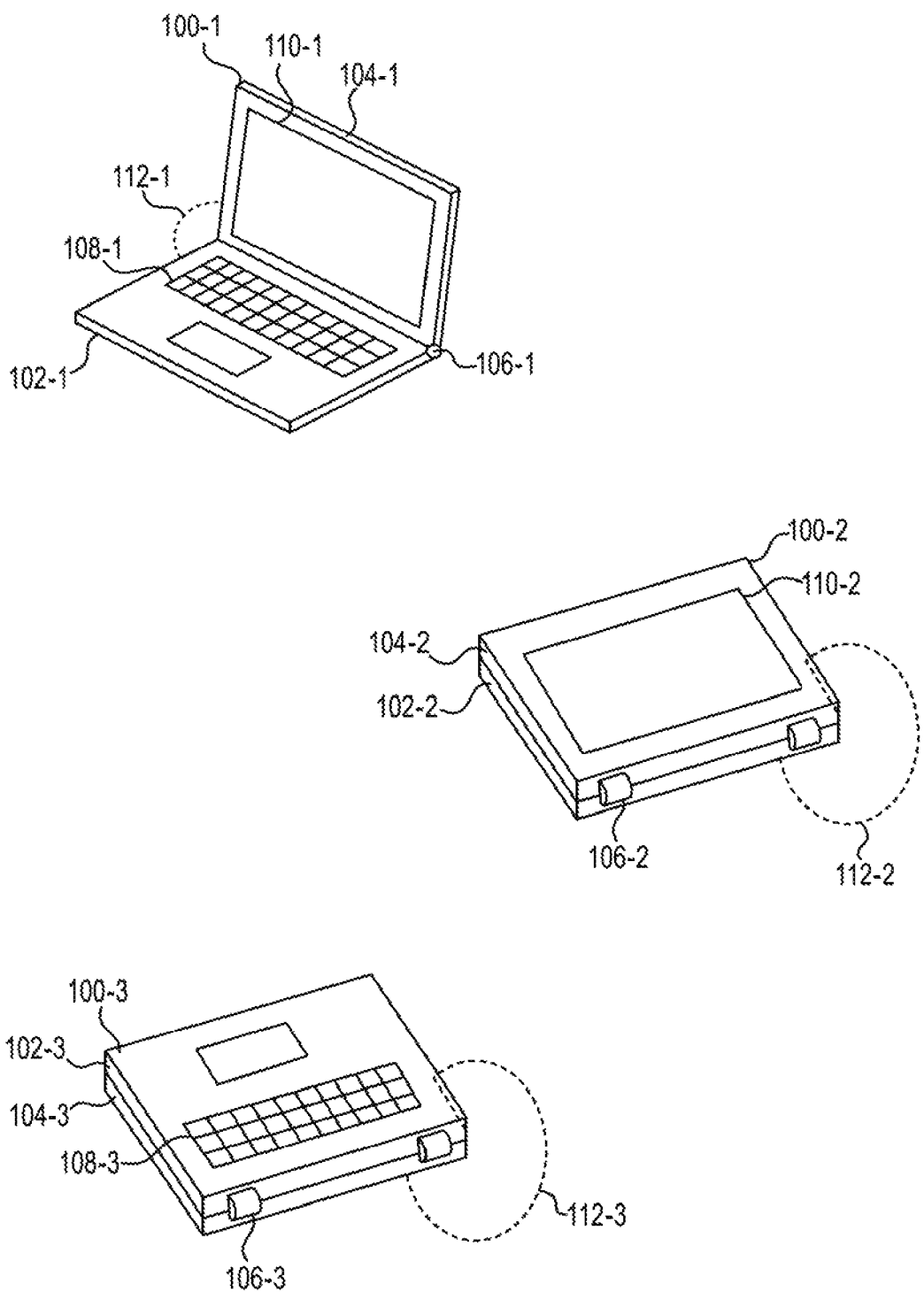
FIG. 1 illustrates an example of a computing device to enable configuration based operation modes consistent with the disclosure.

A computing device may include a processing resource such as electronic circuitry to execute instructions stored on machine-readable medium to perform various operations. Computing devices may be static or mobile. A static computing device may include a computing device designed for regular use in a single location. For example, a static computing device may include a desktop computer or other computing device that is utilized in a single location. A mobile computing device may include a portable computing device that is designed to be used in a variety of settings and to be transported between the two with relatively little effort. A mobile computing device may combine inputs, outputs, components, and capabilities that are otherwise separate in a static computing device. A mobile computing device may include a laptop computer, smartphone, other smart device, a tablet computer, a personal digital assistant, a convertible laptop, etc.

A user of a mobile computing device may desire to share functions between their mobile computing device and other mobile computing devices, static computing devices, and/or peripheral devices (e.g., printing devices, displaying devices, speakers, input devices, output devices, storage devices, etc.). However, some mobile computing devices may have a limited ability to share functions. For example, some mobile computing devices may be unable to discontinue functions, unable to perform limited functions, unable to recognize other devices to export functions to, unable to export functions, and/or unable to recognize when to discontinue, limit, and/or export functions. Additionally, the power limitations associated with some mobile computing device such as a limited battery life may limit sharing functions between a mobile computing device and another device.

Further, space constraints may limit the ability to share functions between computing devices. For example, some users may carry their mobile computing device between a work environment and a home environment. When the user arrives at, for example, work, they may connect a peripheral monitor to the mobile computing device that is relatively large compared to a display on the mobile computing device. In this manner, the user may utilize their mobile computing device to perform work and have the added convenience of being able to pick up their mobile computing device and take it with them at the end of the day. Connecting the mobile computing device to a peripheral monitor may allow the user more display space and a larger view of the graphical user interface (GUI), which may improve the user experience. However, placing a mobile computing device such as a laptop on a small work desk may create a visual impediment between the user and the peripheral monitor. For example, a laptop display may exceed twelve inches in height while a peripheral monitor may rest on a based that is only four inches in height. Placing the laptop in front of the peripheral monitor will block a user from seeing a portion of the peripheral monitor rendering that portion of the peripheral monitor unusable. Since the user is utilizing the keyboard on the laptop in the example, the laptop remains situated in front of the monitor.

As such, users may opt to utilize separate single-function devices such as a wireless keyboard or limited-function devices such as a tablet that does not include a physical keyboard rather than utilizing a mobile computing device that already includes these functionalities. As a result, users may purchase many single/limited-function devices in addition to purchasing a mobile computing device that has some of the same functions integrated. A user may then be burdened by the transport of the single/limited-function devices in addition to the mobile computing device that has some of the same functions integrated or risk not being able to have the device available.

In contrast, examples of the present disclosure may include computing devices, methods, and machine-readable media to enable configuration based operation modes for a mobile computing device. For example, a mobile computing device may include an integrated physical keyboard, an integrated display, and a memory resource including executable instructions to determine a configuration of the mobile computing device and disable the integrated display and enable an operation mode permitting utilization of the physical keyboard with a non-integrated display based on the configuration.

FIG. 1 illustrates an example of a computing device 100-1, 100-2, 100-3 to enable configuration based operation modes consistent with the disclosure. The computing device 100-1, 100-2, 100-3 may be a mobile computing device. The computing device 100-1, 100-2, 100-3 may be a convertible computing device. As used herein, a convertible computing device may include a computing device that is convertible for use as a traditional laptop computing device accepting input from an integrated physical keyboard and/or a touchscreen or as a tablet computing device accepting input from just the touchscreen. The convertible laptop may utilize distinct Basic Input/Output System (BIOS) modes that control the allowable or recognized inputs and/or outputs associated with the traditional laptop and tablet computing device use modes described above.

The computing device 100-1, 100-2, 100-3 may include a plurality of connected housings (e.g., 102-1, 102-2, 102-3, 104-1, 104-2, 104-3). For example, the computing device 100-1, 100-2, 100-3 may include a first housing 102-1, 102-2, 102-3. The first housing 102-1, 102-2, 102-3 may include a housing containing the computing portion of the computing device 100-1, 100-2, 100-3. The computing portion may include the processing resource (e.g., a central processing unit (CPU), a graphics processing unit (GPU), etc.), a memory resource, an input/out port, and/or a battery.

The computing portion may include the components that enable the operation of the operating system and applications of the computing device 100-1, 100-2, 100-3. The computing portion may include the hardware that executes commands and generates outputs for the computing device 100-1, 100-2, 100-3.

The computing device 100-1, 100-2, 100-3 may include a second housing 104-1, 104-2, 104-3. The second housing 104-1, 104-2, 104-3 may include hardware associated with generating a displayed image of a user interface. The second housing 104-1, 104-2, 104-3 may also include hardware associated with a touchscreen user interface.

The first housing 102-1, 102-2, 102-3 and the second housing 104-1, 104-2, 104-3 may be connected. The connection between the first housing 102-1, 102-2, 102-3 and the second housing 104-1, 104-2, 104-3 may be designed to be a substantially permanent connection that is not designed to be readily and/or repeatedly disconnected. For example, the connection may accommodate wiring between connection points in the first housing 102-1, 102-2, 102-3 and connection points in the second housing 104-1, 104-2, 104-3 that is not releasable from the connection points in either housing without damaging the computing device 100-1, 100-2, 100-3 (e.g., wiring soldered to circuitry at the connection points).

The connection between the first housing 102-1, 102-2, 102-3 and the second housing 104-1, 104-2, 104-3 may include a hinge mechanism 106-1, 106-2, 106-3. The first housing 102-1, 102-2, 102-3 and the second housing 104-1, 104-2, 104-3 may be rotatable about the hinge mechanism 106-1, 106-2, 106-3. Rotation of the first housing 102-1, 102-2, 102-3 and the second housing 104-1, 104-2, 104-3 about a rotational axis passing through a center the hinge mechanism 106-1, 106-2, 106-3 may after an orientation of the first housing 102-1, 102-2, 102-3 and the second housing 104-1, 104-2, 104-3 with respect to each other by altering an angle between the first housing 102-1, 102-2, 102-3 and the second housing 104-1, 104-2, 104-3.

The computing device 100-1, 100-2, 100-3 may include an integrated physical keyboard 108-1, 108-3. An integrated physical keyboard 108-1, 108-3 may include a physical keyboard, as opposed to a virtual keyboard, that is integrated with the first housing 102-1, 102-2, 102-3. For example, an integrated physical keyboard 108-1, 108-3 may include a physical keyboard that is contained on top of and/or partially within the first housing 102-1, 102-2, 102-3. The integrated physical keyboard 108-1, 108-3 may not include a releasable connection with the first housing 102-1, 102-2, 102-3 and/or the second housing 104-1, 104-2, 104-3, but rather may be inset to a face of the first housing 102-1, 102-2, 102-3. The integrated physical keyboard 108-1, 108-3 may utilize power supplied through the first housing 102-1, 102-2, 102-3 and may include a wired connection to the first housing 102-1, 102-2, 102-3. The integrated physical keyboard 108-1, 108-3 may be a physical keyboard that is a physically integrated part of the computing device 100-1, 100-2, 100-3.

The computing device 100-1, 100-2, 100-3 may include an integrated display 110-1, 110-2. An integrated display 110-1, 110-2 may include a display capable of displaying images of a graphical user interface. The integrated display 110-1, 110-2 may be integrated with the second housing 104-1, 104-2, 104-3. The hardware associated with generating a displayed image may be contained within the second housing 104-1, 104-2, 104-3. A screen portion of a display where the images are manifested may be visible on one face of the second housing 104-1, 104-2, 104-3. The integrated display 110-1, 110-2 may be overlaid with a user input detecting device such as a touchscreen. The integrated display 110-1, 110-2 may not include a releasable connection with the second housing 104-1, 104-2, 104-3 and/or the first housing 102-1, 102-2, 102-3, but rather may be inset to a face of the second housing 104-1, 104-2, 104-3. The integrated display 110-1, 110-2 may utilize power supplied through the second housing 104-1, 104-2, 104-3 and may include a wired connection to the second housing 104-1, 104-2, 104-3 and/or first housing 102-1, 102-2, 102-3. The integrated display 110-1, 110-2 may be a physically integrated part of the computing device 100-1, 100-2, 100-3.

The computing device 100-1, 100-2, 100-3 may include a memory resource. The memory resource may be utilized to stored instructions. The instructions may be executable by the processing resource to perform various operations. For example, the memory resource may include instructions executable to determine a configuration of the computing device 100-1, 100-2, 100-3.

A configuration of the computing device 100-1, 100-2, 100-3 may correspond to a particular Basic Input/Output System (BIOS) mode that the computing device 100-1, 100-2, 100-3 is operating in. The computing device 100-1, 100-2, 100-3 may function differently depending on which configuration it is in. For example, a particular configuration may be associated with particular operations, inputs, and/or outputs being allowed or not-allowed.

The determination of the configuration of the computing device 100-1, 100-2, 100-3 may be based on an orientation of the components of the computing device 100-1, 100-2, 100-3. The orientation of the components of the computing device 100-1, 100-2, 100-3 may include the positioning of the components in relation to each other and/or in relation to a user or a work surface. As used herein, a work surface may include a surface that the computing device 100-1, 100-2, 100-3 is sitting on and/or supported by during its operation. Examples of a work surface may include a desk, a user's lap, a palm of a hand, a wall, a piece of furniture, the ground, etc. Examples of an orientation may include a positional relationship between the first housing 102-1, 102-2, 102-3 and the second housing 104-1, 104-2, 104-3, a positional relationship between the integrated display 110-1, 110-2 and the integrated physical keyboard 108-1, 108-3, a positional relationship between a functional side of the integrated display 110-1, 110-2 and a functional side of the integrated physical keyboard 108-1, 108-3, and or a positional relationship of any of the above listed components and a user and/or a work surface.

As used herein, a functional side of the integrated physical keyboard 108-1, 108-3 may include a surface of the integrated physical keyboard 108-1, 108-3 that accepts user touch as input. For example, the functional side of the integrated physical keyboard 108-1, 108-3 may include the surface of the integrated physical keyboard 108-1, 108-3 that is keyed with mechanically actuatable keys that correspond to particular alphanumeric and specific command inputs. As used herein, a functional side of the integrated display 110-1, 110-2 may include a surface of the integrated display 110-1, 110-2 upon and/or through which an electronic visual display can be viewed. That is, the functional side of the integrated display 110-1, 110-2 may include a displaying surface of the integrated display 110-1, 110-2. In some examples, the functional side of the integrated display 110-1, 110-2 may include a surface of the integrated display 110-1, 110-2 including a touchscreen input receiving device laid over the electronic visual display.

A positional relationship between the above mentioned components of the computing device 100-1, 100-2, 100-3 may be quantified using an angle 112-1, 112-2, 112-3 (illustrated by a hashed line) between the components. The angles 112-1, 112-2, 112-3 may be defined relative to a vertex. The vertex may include the hinge mechanism 106-1, 106-2, 106-3. A positional relationship between the above mentioned components of the computing device 100-1, 100-2, 100-3 and a user and/or a work surface may be characterized by which way the component faces relative to the user and/or the work surface. For example, a positional relationship between a user and the functional side of the integrated display 110-1, 110-2 may be characterized by whether the functional side of the integrated display 110-1, 110-2 is facing a face of a user. In another example, a positional relationship between a work surface and an integrated physical keyboard 108-1, 108-3 may be characterized by whether the functional side of the integrated physical keyboard 108-1, 108-3 is facing the work surface.

The orientation of the components of the computing device 100-1, 100-2, 100-3 may be determined based on sensors in the computing device 100-1, 100-2, 100-3. For examples, the orientation of the components of the computing device 100-1, 100-2, 100-3 may utilize sensors such as cameras, light sensors, pressure sensor, etc. In other examples, the orientation of the components of the computing device 100-1, 100-2, 100-3 may be determined utilizing sensors such as accelerometers. The orientation of the components of the computing device 100-1, 100-2, 100-3 may also be determined based on user input specifying an orientation.

Further, an orientation of the components of the computing device 100-1, 100-2, 100-3 may be determined based on a manipulation of the first housing 102-1, 102-2, 102-3 and/or the second housing 104-1, 104-2, 104-3 changing the positional relationship between the two. For example, the computing device 100-1, 100-2, 100-3 may determine that it is operating in a first BIOS mode corresponding to a table configuration (illustrated as computing device 100-2 in FIG. 1). The first BIOS mode corresponding to a tablet configuration may include a BIOS mode that disables inputs from the integrated physical keyboard 108, 108-3.

The computing device 100-1, 100-2, 100-3 may detect, via an integrated accelerometer, that the computing device (e.g., 100-2) operating in the first BIOS mode has been flipped upside down. Being flipped upside down may include changing the orientation of the integrated display 110-1, 110-2 from facing the user to facing the work surface and changing the orientation of the integrated physical keyboard 108-1, 108-3 from facing the work surface to facing the user by flipping the computing device 100-1, 100-2, 100-3.

Responsive to determining that that the computing device (e.g., 100-2) operating in the first BIOS mode has been flipped upside down, the computing device 100-1, 100-2, 100-3 may determine that it is in a keyboard configuration (illustrated as computing device 100-3 in FIG. 1) which may correspond to a second BIOS mode discussed in further detail below. In an additional example, the computing device 100-1, 100-2, 100-3 may determine that it is operating in a first BIOS mode corresponding to a laptop configuration (illustrated as computing device 100-1 in FIG. 1).

The first BIOS mode corresponding to a laptop configuration may include a BIOS mode that accepts inputs from the integrated physical keyboard 108, 108-3 and generates outputs in the form of a visual display at the integrated display 110-1, 110-2. The computing device 100-1, 100-2, 100-3 may detect, via an integrated accelerometer, that the integrated display 110-1, 110-2 of the computing device (e.g., 100-1) operating in the first BIOS mode has been folded backwards and under the integrated physical keyboard 108-1, 108-3.

Being folded backwards and under the integrated physical keyboard 108-1, 108-3 may include changing the orientation of the integrated display 110-1, 110-2 such that the angle between the functional face of the integrated display 110-1, 110-2 and the functional face of the integrated physical keyboard 108-1, 108-3 exceeds one hundred and eighty degrees and/or reaches a predefined threshold boundary associated with a largest achievable angle. Responsive to determining that that the integrated display 110-1, 110-2 of the computing device (e.g., 100-1) operating in the first BIOS mode has been folded backwards and under the integrated physical keyboard 108-1, 108-3, the computing device 100-1, 100-2, 100-3 may determine that it is in a keyboard configuration (illustrated as computing device 100-3 in FIG. 1) which may correspond to a second BIOS mode discussed in further detail below.

As described above, the determination of the configuration of the computing device 100-1, 100-2, 100-3 may be based on an orientation of the components of the computing device 100-1, 100-2, 100-3. For example, a configuration may be associated with an orientation or a range of orientations. In an example, a determination that a computing device 100-1, 100-2, 100-3 is in a laptop configuration (e.g., an example a computing device that is in an orientation that may be associated with a laptop configuration is illustrated for computing device 100-1) may be made when the angle 112-1 between the functional side of the integrated display 110-1, 110-2 and a functional side of an integrated physical keyboard 108-1, 108-3 is between zero degrees and one hundred and eighty degrees.

In another example, a determination that a computing device 100-1, 100-2, 100-3 is in a tablet configuration (e.g., an example a computing device that is in an orientation that may be associated with a tablet configuration is illustrated for computing device 100-2) may be made when the angle 112-2 between the functional side of the integrated display 110-1, 110-2 and a functional side of an integrated physical keyboard 108-1, 108-3 is greater than one hundred and eighty degrees, the functional side of the integrated display 110-1, 110-2 is facing the user, and/or the functional side of an integrated physical keyboard 108-1, 108-3 is facing a work surface.

In another example, a determination that a computing device 100-1, 100-2, 100-3 is in a keyboard configuration (e.g., an example a computing device that is in an orientation that may be associated with a keyboard configuration is illustrated for computing device 100-3) may be made when the angle 112-3 between the functional side of the integrated display 110-1, 110-2 and a functional side of an integrated physical keyboard 108-1, 108-3 is greater than one hundred and eighty degrees, the functional side of the integrated display 110-1, 110-2 is facing the work surface, and/or the functional side of an integrated physical keyboard 108-1, 108-3 is facing a user.

Typically, when a computing device 100-1, 100-2, 100-3 is in the laptop configuration both the integrated display 110-1, 110-2 and the integrated physical keyboard 108-1, 108-3 remain operational during utilization of the computing device 100-1, 100-2, 100-3. When a computing device 100-1, 100-2, 100-3 is in the tablet configuration, typically the integrated display 110-1, 110-2 remains operational but the integrated physical keyboard 108-1, 108-3 is disabled.

Typically, when a computing device 100-1, 100-2, 100-3 is in the keyboard configuration either the integrated display 110-1, 110-2 remains operational but the integrated physical keyboard 108-1, 108-3 is disabled as though the computing device 100-1, 100-2, 100-3 is in the tablet configuration.

In contrast, the memory resource of the computing device 100-1, 100-2, 100-3 described herein may include instructions executable to disable the integrated display 110-1, 110-2 and to enable an operation mode permitting utilization of the integrated physical keyboard 108-1, 108-3 with a non-integrated display based on the configuration. As used herein, a non-integrated display is physically separate from the computing device 100-1, 100-2, 100-3 and has a separate power supply from the computing device 100-1, 100-2, 100-3. For example, a non-integrated display may include a peripheral monitor, a separate monitor, a desktop monitor, a display of a second computing device, a seat back display in an airplane or car, television screen, interactive whiteboard, augmented reality headset, virtual reality headset, etc.

Disabling the integrated display 110-1, 110-2 and/or enable an operation mode permitting utilization of the physical keyboard 108-1, 108-3 with a non-integrated display may include the computing device 100-1, 100-2, 100-3 switching to a different BIOS mode that includes limiting the inputs and outputs of an integrated display 110-1, 110-2 and altering or maintaining the inputs and outputs of the integrated physical keyboard 108-1, 108-3 such that, in either case, the integrated physical keyboard 108-1, 108-3 may be utilized in conjunction with the non-integrated display. Switching to the different BIOS may be triggered responsive to a determination that the non-integrated display is in communication with the computing device 100-1, 100-2, 100-3. The computing device 100-1, 100-2, 100-3 may avoid triggering the switch if it is determined that no non-integrated display is in communication with the computing device 100-1, 100-2, 100-3.

Disabling the integrated display 110-1, 110-2 may include disabling the ability of the integrated display 110-1, 110-2 to display images on the functional side of the integrated display 110-1, 110-2 and/or disabling the ability of a touchscreen laid over the integrated display 110-1, 110-2 to receive and/or respond to user input. Disabling the integrated display 110-1, 110-2 may include interrupting the power supplied to the integrated display 110-1, 110-2 and/or sending the integrated display 110-1, 110-2 into a reduced power consumption mode. Disabling the integrated display 110-1, 110-2 may be performed responsive to a determination that a non-integrated display is available for connection to the computing device 100-1, 100-2, 100-3. The determination may result from a scan for non-integrated displays available for connection (e.g., wireless connection, wired connection, etc.) that is triggered by a determination that the computing device 100-1, 100-2, 100-3 is in a configuration such as the keyboard configuration with the integrated display 110-1, 110-2 facing away from a user.

Enabling an operation mode permitting utilization of the integrated physical keyboard 108-1, 108-3 with the non-integrated display may also be based on the configuration. For example, enabling the operation mode may be triggered responsive to a determination that the keyboard configuration with the integrated display 110-1, 110-2 facing away from a user and/or toward a work surface. Enabling the operation mode permitting utilization of the integrated physical keyboard 108-1, 108-3 with the non-integrated display may include enabling the utilization of the integrated physical keyboard 108-1, 108-3 while the integrated display 110-1, 110-2 is disabled and while the integrated display 110-1, 110-2 is still integrated in the second housing 104-1, 104-2, 104-3 of the computing device 100-1, 100-2, 100-3 which is still connected to the first housing 102-1, 102-2, 102-3 of the computing device 100-1, 100-2, 100-3.

Enabling an operation mode permitting utilization of the integrated physical keyboard 108-1, 108-3 with the non-integrated display may include enabling an operation mode that allows the computing device 100-1, 100-2, 100-3 to continue to accept inputs from the integrated physical keyboard 108-1, 108-3 and translate the inputs to commands executable by the computing device 100-1, 100-2, 100-3. Enabling an operation mode permitting utilization of the integrated physical keyboard 108-1, 108-3 with the non-integrated display may include enabling an operation mode that allows the computing device 100-1, 100-2, 100-3 to execute instructions to provide an operating system, an application, a GUI, etc. that is displayed on the non-integrated display. That is, enabling an operation mode permitting utilization of the integrated physical keyboard 108-1, 108-3 with the non-integrated display may include enabling the computing device 100-1, 100-2, 100-3 to function as though it were in the laptop configuration, but instead of utilizing the integrated display 110-1, 110-2 as the display for the computing device 100-1, 100-2, 100-3, the non-integrated display is used as the display for the computing device 100-1, 100-2, 100-3.

As such, the computing device 100-1, 100-2, 100-3 may realize a substantial power savings and/or extension of battery life through not powering the integrated display 110-1, 110-2. Further, a user may operate the computing device 100-1, 100-2, 100-3 in the keyboard configuration without having to worry about interfering inputs being detected from the work surface at the touchscreen of the integrated display 110-1, 110-2. Furthermore, in contrast to blocking a portion of the non-integrated display with the integrated display 110-1, 110-2 when utilizing the integrated physical keyboard 108-1, 108-3 in a laptop configuration, the user may fold the integrated display 110-1, 110-2 away under the keyboard while still utilizing the computing device 100-1, 100-2, 100-3 as though it were in a laptop configuration.

Further, enabling an operation mode permitting utilization of the integrated physical keyboard 108-1, 108-3 with the non-integrated display may include utilizing the computing device 100-1, 100-2, 100-3 to authenticate the integrated physical keyboard 108-1, 108-3 with the non-integrated display. For example, the non-integrated display may include a security protocol that involves authentication of peripherals and/or a computing device 100-1, 100-2, 100-3 that is attempting to connect to the non-integrated display. Enabling an operation mode permitting utilization of the integrated physical keyboard 108-1, 108-3 with the non-integrated display may include the computing device 100-1, 100-2, 100-3 providing that authentication to the non-integrated display to initiate a session between the computing device 100-1, 100-2, 100-3 and the non-integrated display.

In another example, enabling an operation mode permitting utilization of the integrated physical keyboard 108-1, 108-3 with the non-integrated display may include enabling an operation mode that transitions the computing device 100-1, 100-2, 100-3 into a sleep mode while enabling the integrated physical keyboard 108-1, 108-3 to operate as a discrete peripheral device for a second computing device. That is, the integrated physical keyboard 108-1, 108-3 may be enabled to operate as a peripheral physical keyboard that accepts input from a user and communicates the input to the second computing device for execution. The computing device 100-1, 100-2, 100-3 may not process or execute the inputs received by the integrated physical keyboard 108-1, 108-3 other than in transmitting the inputs to the second computing device.

During utilization of the integrated physical keyboard 108-1, 108-3 as a peripheral keyboard for the second computing device, the integrated physical keyboard 108-1, 108-3 may remain integrated in the first housing 102-1, 102-2, 102-3 of the computing device 100-1, 100-2, 100-3 and/or draw its power from the computing device 100-1, 100-2, 100-3. In this manner, a user may utilize the integrated physical keyboard 108-1, 108-3 that they are familiar and comfortable with as an input device for a second computing device. For example, a user may utilize the integrated physical keyboard 108-1, 108-3 of their computing device 100-1, 100-2, 100-3 as a peripheral keyboard for a second computing device in a public conference room that may not have a keyboard attached.

In some examples, enabling an operation mode permitting utilization of the integrated physical keyboard 108-1, 108-3 with the non-integrated display may include activating a radio transceiver associated with identifying, connecting to, and wirelessly communicating with the second computing device. For example, enabling an operation mode permitting utilization of the integrated physical keyboard 108-1, 108-3 with the non-integrated display may include activating a radio transceiver that allows for Bluetooth® communications (e.g., exchanging data over short distances using short-wavelength UHF radio waves in the ISM band from 2.4 to 2.485 GHz and building personal area networks (PANs)) with the second computing device.

As such, enabling an operation mode permitting utilization of the integrated physical keyboard 108-1, 108-3 with the non-integrated display may include performing a scan for nearby computing devices to be paired with the mobile computing device 100-1, 100-2, 100-3 for the above described communication. Further, enabling an operation mode permitting utilization of the integrated physical keyboard 108-1, 108-3 with the non-integrated display may include sending the computing device 100-1, 100-2, 100-3 into a sleep mode and/or pairing the computing device 100-1, 100-2, 100-3 with the second computing device for wireless communications responsive to a successful scan determining that that the second computing device is present and available for pairing.

In yet another example, enabling an operation mode permitting utilization of the integrated physical keyboard 108-1, 108-3 with the non-integrated display may include enabling a reduced functionality mode of the computing device 100-1, 100-2, 100-3. The reduced functionality mode may include enabling the computing device 100-1, 100-2, 100-3 to authenticate the integrated physical keyboard 108-1, 108-3 with the second computing device including the non-integrated display. For example, the second computing device may include a security protocol that involves authentication of a peripheral that is attempting to connect thereto.

Enabling an operation mode permitting utilization of the integrated physical keyboard 108-1, 108-3 with the second computing device may include the computing device 100-1, 100-2, 100-3 providing authentication to the second computing device including non-integrated display to allow the integrated physical keyboard 108-1, 108-3 to establish a connection and serve as an input device for the second computing device including non-integrated display. The computing device 100-1, 100-2, 100-3 may enter a sleep state after authenticating the integrated physical keyboard 108-1, 108-3 that preserves the utilization of the integrated physical keyboard 108-1, 108-3 but reduces the power consumption by the other components of the computing device 100-1, 100-2, 100-3. In this manner, a user may utilize the integrated physical keyboard 108-1, 108-3 that they are familiar and comfortable with as an input device for a second computing device that utilizes security protocols to authenticate peripherals before allowing their utilization. For example, a user may utilize the integrated physical keyboard 108-1, 108-3 of their computing device 100-1, 100-2, 100-3 as a peripheral keyboard for a second computing device in a public conference room that may not have a keyboard attached and utilizes security protocols to authenticate peripherals before allowing their utilization.

Figure 2:
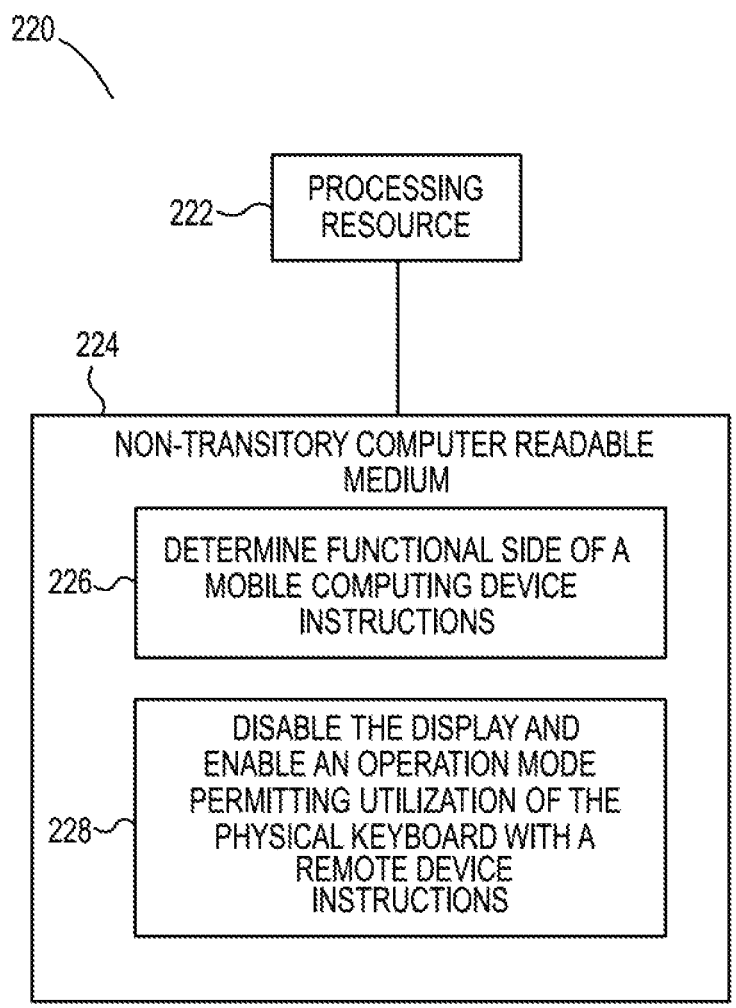
FIG. 2 illustrates a diagram of an example of a processing resource and a non-transitory computer readable medium to enable configuration based operation modes consistent with the disclosure.

FIG. 2 illustrates a diagram 220 of an example of a processing resource 222 and a non-transitory computer readable medium 224 to enable configuration based operation modes consistent with the disclosure. A memory resource, such as the non-transitory computer readable medium 224, may be used to store instructions (e.g., 224, 228) executed by the processing resource 222 to perform the operations as described herein. A processing resource 222 may execute the instructions stored on the non-transitory computer readable medium 224. The non-transitory computer readable medium 224 may be any type of volatile or non-volatile memory or storage, such as random access memory (RAM), flash memory, read-only memory (ROM), storage volumes, a hard disk, or a combination thereof.

The example medium 224 may store instructions 226 executable by the processing resource 222 to determine a functional side of a mobile computing device. A functional side of a mobile computing device may be the face of mobile computing device that is to be utilized by the user to interact with the computing device. Determining the functional side of the mobile computing device may include determining whether an integrated display side or an integrated physical keyboard side of the computing device is to be utilized by the user to interact with the computing device. In some examples, determining the functional side of the mobile computing device may include determining whether a functional side of an integrated display (e.g., the displaying and/or touchscreen face of the integrated display) or a functional side an integrated physical keyboard (e.g., the keyed face of the integrated physical keyboard) of the computing device is to be utilized by the user to interact with the computing device.

The determination of the functional side of the mobile computing device may be based on an orientation of the integrated display and/or an orientation of the integrated physical keyboard. The determination of the functional side of the mobile computing device may be based on an orientation of the functional side of the integrated display and/or an orientation of the functional side of the integrated physical keyboard. As described above, the orientation of the functional side of the integrated display and/or an orientation of the functional side of the integrated physical keyboard may include an angle between the functional side of the integrated display and the functional side of the integrated physical keyboard.

As such, the instructions 226 may be executable by the processing resource 222 to determine an orientation of the integrated display and/or an orientation of the integrated physical keyboard. The determination may include a determination of the orientation of the functional side of the integrated display relative to a user and/or relative to a work surface. The determination may include a determination of the orientation of the functional side of the integrated physical keyboard relative to a user and/or relative to a work surface. That is, the determination may include a determination of whether the functional side of the integrated display and/or the functional side of the integrated physical keyboard are facing a user or a work surface.

The keyed face of the integrated physical keyboard may be determined to be the functional side of the mobile computing device when an orientation is determined including an angle between the displaying side of the integrated display and the keyed side of the integrated physical keyboard is greater than one hundred and eighty degrees, the displaying side of the integrated display is facing the work surface, and/or the keyed side of an integrated physical keyboard is facing the user.

The displaying face of the integrated display may be determined to be the functional side of the mobile computing device when an orientation is determined including an angle between the displaying side of the integrated display and the keyed side of an integrated physical keyboard that is greater than one hundred and eighty degrees, the displaying side of the integrated display is facing the user, and/or the keyed side of an integrated physical keyboard is facing a work surface. Both the keyed face integrated physical keyboard and the displaying face of the integrated display may be determined to be the functional sides of the computing device when an orientation is determined including an angle between the displaying side of the integrated display and the keyed side of an integrated physical keyboard that is between zero degrees and one hundred and eighty degrees and the displaying side of the integrated display and the keyed side of an integrated physical keyboard face the user.

The example medium 224 may store instructions 226 executable by the processing resource 222 to disable the display and enable an operation mode permitting utilization of the physical keyboard with a remote device. As used herein, a remote device may include a computing device that is separate from the mobile computing device and/or does not draw power from or share power with the mobile computing device. A remote device may also include a display. A display of a remote device may be a display that is integrated with a remote computing device and/or is a peripheral of the remote computing device. A remote device may also include a monitor that is separate from the mobile computing device and/or does not draw power from or share power with the mobile computing device.

Disabling the display and enabling an operation mode permitting utilization of the physical keyboard with a remote device may be based on and/or responsive to a determination that the integrated physical keyboard and/or the keyed surface of the integrated physical keyboard is the functional side of the mobile computing device. For example, the display may be turned off and the mobile computing device may be sent into a sleep state while leaving the physical keyboard in an operational state (e.g., capable of capturing user input, translating the user input into digital signals, and/or communicating the digital signals, etc.) based on a determination that the integrated physical keyboard and/or the keyed surface of the integrated physical keyboard is the functional side of the mobile computing device. However, the mobile computing device may authenticate the integrated physical keyboard with the remote device. The authentication may occur before the mobile computing device enters the sleep state. The authentication may permit a connection between the remote device and the integrated physical keyboard. The authentication may allow the remote device to receive and execute the outputs generated by the integrated physical keyboard.

Further, a radio transceiver associated with exchanging data between the integrated physical keyboard and the remote device nay be activated. For example, the radio transceiver may be activated in order to identify and connect the integrated physical keyboard with the remote device responsive to a determination that the integrated physical keyboard and/or the keyed surface of the integrated physical keyboard is the functional side of the mobile computing device.

Figure 3:
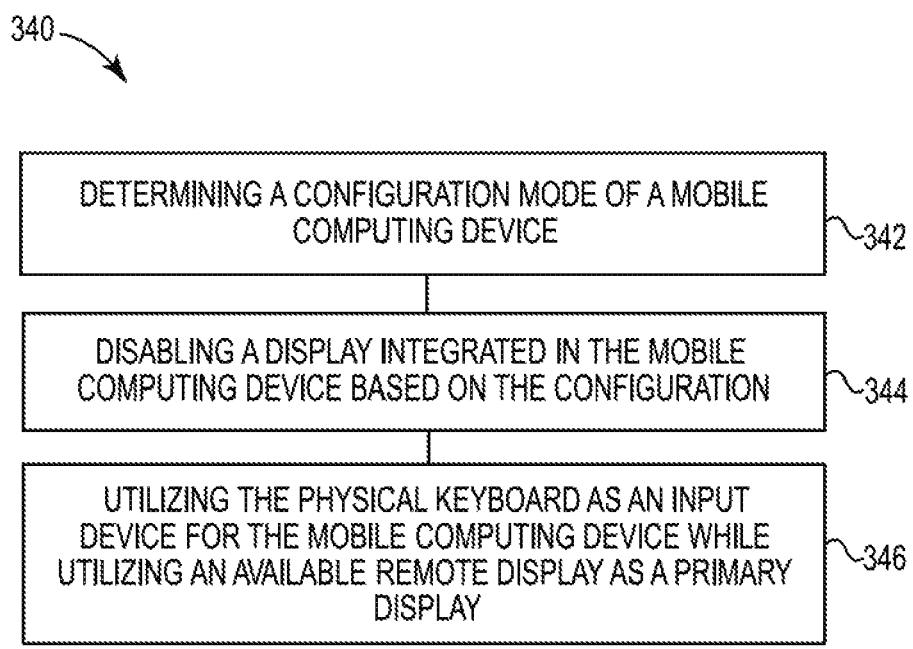
FIG. 3 illustrates a flow diagram of an example of a method to enable configuration based operation modes consistent with the disclosure.

FIG. 3 illustrates a flow diagram of an example of a method 340 to enable configuration based operation modes consistent with the disclosure. At 342, the method 340 may include determining a configuration of the mobile computing device. As described above, the configuration may be determined based on the orientation of the integrated display and the integrated physical keyboard relative to one another and/or relative to a user or work surface. The mobile computing device may be a device that is convertible between at least three orientations including a laptop orientation, a keyboard orientation, and a tablet orientation.

The mobile computing device may determine the configuration responsive to a command from a user. For example, the mobile computing device may receive a command from a user specifying that the mobile computing device should initiate configuration based operation modes. In an example, a user may select an option to initiate configuration based operation modes when boarding an airplane.

At 344, the method 340 may include disabling a display integrated in the mobile computing device based on the configuration. For example, responsive to a determination that the mobile computing device is in a keyboard configuration, the mobile computing device may interrupt or reduce the power supplied to the integrated display so that the display turns off. That is, disabling the display may include rendering the display temporarily unable to display images generated by the mobile computing device. Disabling the display may also include disabling other components of the mobile computing device. For example, disabling the display may include disabling a camera integrated with the mobile computing device. The mobile computing device may temporarily prevent a camera located on the same housing as the display from operating and/or receiving/executing commands from the mobile computing device. In another example, disabling the display may include disabling a speaker integrated with the mobile computing device. The mobile computing device may temporarily prevent a speaker located in the housing of the mobile computing device from operating and/or receiving/executing commands from the mobile computing device.

Alternatively, disabling the integrated display may include disabling the integrated display from use as a primary display but allowing it to function as a secondary display. The integrated display may serve as a secondary display in a reduced power consumption mode with decreased resolution, decreased brightness, and/or decreased screen timeout triggering times.

Additionally, responsive to a determination that the mobile computing device is in a keyboard configuration, the mobile computing device may begin scanning for available non-integrated displays. Non-integrated displays may include displays that are physically separate from the mobile computing device and utilize a separate power source from the mobile computing device.

In an example, responsive to a determination that the mobile computing device is in a keyboard configuration, the mobile computing device may begin scanning for a wired or wireless connection to the non-integrated display that is available for use. As described above, a non-integrated display may include a virtual reality headset. As used herein, a virtual reality headset may include a head-mounted display. The display may be a stereoscopic display including two display panels, one for each eye. The virtual reality headset may also include speakers and/or headphones, adjustable lenses, hard motion tracking sensors, gyroscopes, accelerometers, structured light systems, infrared sensors, eye tracking systems, etc. The virtual reality headset may including a processing resource, a memory resource, and/or instructions stored on the memory resource executable by the processing resource to perform various operations including generating the display and translating user movement detected by the virtual reality headset to view and interact with a GUI. For example, a virtual reality headset may render a virtual desktop environment to appear as though it is on a virtual monitor such that when the virtual reality headset detects a user moving his head to his right side the virtual reality headset will alter the appearance of the virtual desktop environment to make it appear as though the user is viewing a portion of the virtual desktop environment that was out-of-view to the user's right side prior to the movement. That is, the virtual reality headset may correlate the images it displays to a virtual perspective and shift of that perspective of a virtual desktop environment to real world movement of the user's head. In some examples, the mobile computing device may proceed to 346 responsive to identifying a connection to and/or establishing a connection with a virtual reality headset.

At 346, the method 340 may include utilizing the integrated physical keyboard as an input device for the mobile computing device while utilizing an available non-integrated display as a primary display for the mobile computing device. In some examples, the operating system of the mobile computing device may authenticate the mobile computing device and/or the integrated physical keyboard with the non-integrated display.

The mobile computing device may continue to utilize its integrated processing resource, memory resource, and/or instructions stored on the memory resource and executable by the processing resource to generate a desktop environment GUI. The mobile computing device may continue to accept and execute inputs from the integrated physical keyboard in relation to the desktop environment GUI.

In some examples, the mobile computing device may also accept and execute inputs from the non-integrated display, such as inputs from a virtual reality headset. In some examples, the non-integrated display may accept and execute commands from the integrated physical keyboard of the mobile computing device. For example, a virtual reality headset may accept and execute inputs from the integrated physical keyboard of the mobile computing device.

In some examples, the desktop environment may be modified by the mobile computing device for display on the non-integrated display. For example, the desktop environment may be modified by the mobile computing device for display on a virtual reality headset.

In some examples, the desktop environment may be modified by the non-integrated display for display on the non-integrated display. For example, the desktop environment may be modified by a virtual reality headset for display on the virtual reality headset.

Utilizing an available non-integrated display as a primary display for the mobile computing device may include utilizing the non-integrated display to display the desktop environment generated by the mobile computing device.

Utilizing an available non-integrated display as a primary display for the mobile computing device may also include utilizing a camera, a speaker, and/or a headphone integrated with the non-integrated display. The mobile computing device may send commands to and/or receive inputs from the camera, speaker, and/or headphones of the non-integrated display. In an example, when the user orients the mobile computing device into a keyboard configuration, the mobile computing device may switch off the display, camera, and speaker of the mobile computing device and begin to send data to and/or receive data from the non-integrated display that is associated with utilizing the display, camera, and speaker components of the non-integrated display.

In this manner, a user may experience an effortless pairing with and transition to a non-integrated display such as a virtual reality headset. Rather than conducting extensive pairing procedures and adjustments while risking the privacy of their data in cramped locales such as, for example, on an airplane, a user may simply orient their mobile device into the keyboard configuration and immediately begin utilizing their mobile computing device in the privacy of the virtual headset avoiding such complexities and risks.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. A "plurality of" is intended to refer to more than one of such things.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. Further, as used herein, "a number of" an element and/or feature can refer to one or more of such elements and/or features.

What is claimed:

1. A mobile computing device comprising:
   an integrated physical keyboard;
   an integrated display; and
   a memory resource comprising executable instructions to:
      determine a configuration of the mobile computing device based on: an angle between a functional side of the integrated physical keyboard and a functional side of the integrated display; and an orientation of the functional side of the integrated physical keyboard;
      in response to a determination that the angle exceeds a threshold value and the functional side of the integrated physical keyboard faces away from a work surface:
   disable the integrated display from functioning as a primary display, wherein the integrated display is to function as a secondary display in a reduced power consumption mode; and enable an operation mode permitting utilization of the physical keyboard with a non-integrated display.

2. The mobile computing device of claim 1, wherein the integrated physical keyboard is attached to a surface of a first housing of the mobile computing device, wherein the first housing includes a computing portion of the computing device.

3. The mobile computing device of claim 2, comprising a hinge mechanism attached to an edge of the first housing and an edge of a second housing to allow the integrated display and the integrated keyboard to rotate into a plurality of orientations.

4. The mobile computing device of claim 1, wherein the instructions to determine the configuration include instructions to determine that the mobile computing device is in a keyboard configuration.

5. The mobile computing device of claim 4, wherein the determination that the mobile computing device is in the keyboard configuration mode is based on accelerometer data.

6. A non-transitory computer-readable medium containing instructions executable by a processor to cause the processor to:
   determine a functional side of a mobile computing device between an integrated display and an integrated physical keyboard based on:
      an orientation of the integrated display and the integrated physical keyboard; and
      an angle between a functional side of the integrated physical keyboard and a functional side of the integrated display;
   in response to a determination that the angle exceeds a threshold value and the functional side of the integrated physical keyboard faces away from a work surface
      disable the integrated display from functioning as a primary display, wherein the integrated display is to function as a secondary display in a reduced power consumption mode; and
      enable an operation mode permitting utilization of the physical keyboard with a remote device.

7. The medium of claim 6, including instructions executable by the processor to activate a radio transceiver associated with exchanging data between the integrated physical keyboard and the remote device.

8. The medium of claim 6, including instructions executable by the processor to send the mobile computing device into a sleep state based on the determination that the integrated physical keyboard is the functional side of the mobile computing device.

9. The medium of claim 6, wherein the instructions to determine the functional side of the mobile computing device based on the orientation of the integrated display and the integrated physical keyboard includes instructions to determine the orientation of a displaying side of the integrated display and a keyed side of the physical keyboard with respect to a work surface.

10. The medium of claim 6, wherein the instructions to determine the functional side of the mobile computing device based on the orientation of the integrated display and the integrated physical keyboard includes instructions to determine the orientation of a displaying side of the integrated display and a keyed side of the physical keyboard with respect to a user.

11. The medium of claim 6, including instructions executable by the processor to authenticate the integrated physical keyboard with the remote computing device to receive the output of the integrated physical keyboard.

12. A method comprising:
   determining a configuration of a mobile computing device based on: an angle between a functional side of an integrated physical keyboard and a functional side of an integrated display, and an orientation of the functional side of the integrated physical keyboard;
   responsive to a determination that the angle exceeds a threshold value and the functional side of the integrated physical keyboard faces away from a work surface:
   disabling a display integrated in the mobile computing device from functioning as a primary display, wherein the integrated display is to function as a secondary display in a reduced power consumption mode; and
   utilizing the integrated physical keyboard as an input device for the mobile computing device while utilizing an available non-integrated display as the primary display.

13. The method of claim 12, comprising utilizing an operating system of the mobile computing device to authenticate the mobile computing device with the non-integrated display.

14. The method of claim 12, comprising scanning for the available non-integrated display based on the configuration.

* * * * *